United States Patent
Hayashi et al.

(10) Patent No.: US 7,672,032 B2
(45) Date of Patent: Mar. 2, 2010

(54) OPTICAL SCANNER AND IMAGE FORMING APPARATUS USING OPTICAL SCANNER

(75) Inventors: Yoshinori Hayashi, Kanagawa (JP); Kohji Sakai, Tokyo (JP); Takeshi Ueda, Tokyo (JP); Daisuke Ichii, Kanagawa (JP); Kenichiroh Saisho, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 331 days.

(21) Appl. No.: 11/857,811

(22) Filed: Sep. 19, 2007

(65) Prior Publication Data
US 2008/0068693 A1    Mar. 20, 2008

(30) Foreign Application Priority Data
Sep. 19, 2006 (JP) ............... 2006-253375

(51) Int. Cl.
G02B 26/08    (2006.01)
(52) U.S. Cl. ................................. 359/207.7
(58) Field of Classification Search ... 359/204.1–207.7; 347/244, 258, 259; 250/234–236
See application file for complete search history.

(56) References Cited

U.S. PATENT DOCUMENTS

| | | | |
|---|---|---|---|
| 6,650,454 B2 * | 11/2003 | Azami et al. ............. 359/207.7 |
| 6,977,762 B2 | 12/2005 | Hayashi |
| 7,068,407 B2 | 6/2006 | Sakai et al. |
| 7,106,483 B2 | 9/2006 | Hayashi et al. |
| 7,110,016 B2 | 9/2006 | Suzuki et al. |
| 7,145,705 B2 | 12/2006 | Hayashi |
| 7,154,651 B2 | 12/2006 | Atsuumi et al. |
| 7,164,516 B2 | 1/2007 | Hayashi et al. |
| 7,218,432 B2 | 5/2007 | Ichii et al. |
| 7,233,425 B2 | 6/2007 | Hayashi |
| 7,253,937 B2 | 8/2007 | Ueda et al. |
| 2001/0009470 A1 * | 7/2001 | Kamikubo ................... 359/197 |
| 2002/0008896 A1 * | 1/2002 | Ishibe ......................... 359/205 |
| 2004/0196507 A1 | 10/2004 | Sakai |
| 2005/0045814 A1 * | 3/2005 | Shimomura et al. ......... 250/234 |

(Continued)

FOREIGN PATENT DOCUMENTS

JP    11-223784    8/1999

(Continued)

OTHER PUBLICATIONS

U.S. Appl. No. 12/110,862, filed Apr. 28, 2007, Ichii, et al.

(Continued)

*Primary Examiner*—Euncha P Cherry
(74) *Attorney, Agent, or Firm*—Oblon, Spivak, McClelland, Maier & Neustadt, L.L.P.

(57) ABSTRACT

An optical axis of at least one surface of a resin-made diffracting lens is shifted in a main scanning direction with respect to an incident beam. A synchronous detection can cancel a problem of a misalignment in the main scanning direction due to a temperature variation. A light reflected from a second surface of the resin-made diffractive lens condenses on a position that is displaced in an optical axis direction from an optical beam outgoing point of a semiconductor laser, and thereby the light reflected again from the semiconductor laser does not form an image on a scanned surface and an impact on the image becomes low.

18 Claims, 4 Drawing Sheets

U.S. PATENT DOCUMENTS

| | | |
|---|---|---|
| 2006/0000990 A1 | 1/2006 | Hayashi et al. |
| 2006/0077500 A1 | 4/2006 | Hayashi et al. |
| 2006/0187294 A1 | 8/2006 | Saisho et al. |
| 2006/0232659 A1 | 10/2006 | Hayashi et al. |
| 2006/0256185 A1 | 11/2006 | Suzuki et al. |
| 2006/0284968 A1 | 12/2006 | Hayashi et al. |
| 2007/0081217 A1 | 4/2007 | Hayashi et al. |
| 2007/0211325 A1 | 9/2007 | Ichii |

FOREIGN PATENT DOCUMENTS

| | | |
|---|---|---|
| JP | 3697048 | 7/2005 |
| JP | 2005-258392 | 9/2005 |

OTHER PUBLICATIONS

U.S. Appl. No. 12/174,899, filed Jul. 17, 2008, Saisho, et al.
U.S. Appl. No. 12/189,430, filed Aug. 11, 2008, Saisho.
U.S. Appl. No. 12/190,182, filed Aug. 12, 2008, Ichii et al.

* cited by examiner

VERTICAL SCANNING DIRECTION

MAIN SCANNING DIRECTION

OPTICAL SCANNER AND IMAGE FORMING APPARATUS USING OPTICAL SCANNER

CROSS-REFERENCE TO RELATED APPLICATIONS

The present application claims priority to and incorporates by reference the entire contents of Japanese priority document, 2006-253375 filed in Japan on Sep. 19, 2006.

BACKGROUND OF THE INVENTION

1. Field of the Invention

The present invention relates to an optical scanner and an image forming apparatus.

2. Description of the Related Art

An optical scanner is widely used for an image forming apparatus such as an optical printer, a digital copier, and an optical plotter. Recently, the optical scanner has been required to be manufactured at low cost, to be unaffected by environmental fluctuations, and to form an image with high-resolution.

When various lenses to be used in the optical scanner are made of a resin material, such a resin-made lens is light in weight, can be made at low cost, and have easiness in forming a particular surface shape typified by an aspherical surface. Therefore, an adoption of such particular surface shape in the resin-made lens enables enhancing optical properties and reducing the number of lenses included in an optical system.

In other words, the adoption of the resin-made lens contributes to reduction in size, weight, and cost, of the optical scanner. However, because a shape and a refractive index of the resin-made lens change due to the environmental fluctuations, especially due to temperature variation, the optical properties, especially a power, change from a designed value, and a "beam spot diameter" as a diameter of an optical spot on a scanned surface changes due to the environmental fluctuations.

Because, the power of the resin-made lens fluctuates in a positive lens and a negative lens inversely to each other, a method is often used in which "changes in the optical properties due to the environmental fluctuations" that occur in the positive and the negative resin-made lenses in the optical system of the optical scanner are mutually offset.

A semiconductor laser as a common optical source of the optical scanner has properties that an emission wavelength slants to a long-wavelength side upon rise in temperature ("change in a wavelength due to the temperature variation"), and that the wavelength changes due to "mode hop". A change in the wavelength imposes a change in the properties due to chromatic aberration of the optical system used in the optical scanner, the change in the properties further causing a change in the beam spot diameter.

Therefore, in the optical scanner including the resin-made lens in the optical system and uses the semiconductor laser as the optical source, it is necessary to produce an optical design by considering the change in the optical properties due to the temperature variation and the change in the optical properties due to the change in the wavelength in the optical source.

For example, Japanese Patent Application Laid-Open No. 2005-258392 discloses an optical scanner (a laser scanner) which stabilizes the optical properties by adopting a diffracting surface in the optical system located at a stage before a deflector in the light passage (hereinafter referred to as "optical system before the deflector") in consideration of the change in the optical properties due to the temperature variation and the change in the wavelength in the optical source.

Furthermore, Japanese Patent Application Laid-Open No. H11-223784 discloses an optical scanner which employs the diffracting surface in the optical system located at a stage after the deflector in the light passage (hereinafter referred to as "optical system after the deflector").

In Japanese Patent Application Laid-Open No. 2005-258392, even if an optical element having the diffracting surface in the optical system before the deflector, it is necessary when using the resin-made diffractive lens to consider, because of the following reasons, a returning light to the semiconductor laser, which is not referred to in the technology of Japanese Patent Application Laid-Open No. 2005-258392.

Reason 1: A reflected scattered light on the diffracting surface is larger than that on a refractive surface in quantity.

Reason 2: A resin has lower melting point and more difficulty in coating than a glass.

When such reflected scattered light again returns to the semiconductor laser, the following problems arise.

Problem 1: When the beam of the optical source enters again in a resonator of the semiconductor laser, an outgoing light quantity varies and density irregularities occur on an image.

Problem 2: The beam reflected again on an end facet or a stem of the semiconductor laser is returned to the scanned surface, and the density irregularities occur on the image.

There are many examples of a scanning optical system which has the diffracting surface, including Japanese Patent Application Laid-Open No. H11-223784. When the diffracting surface is employed in the scanning optical system, the beam deflected by the deflector is passed, and therefore it is not necessary to consider the returning light to a laser diode (LD). However, a difference occurs between the change in a magnification ratio of a main scanning due to the temperature variation which causes changes in the shape and the optical source wavelength at the same time, and the change in the magnification ratio of the main scanning only due to the change in the optical source wavelength such as skipping of the wavelength. As a result, when the optical scanner is loaded in a multi-color image forming apparatus, a significant color drift occurs.

SUMMARY OF THE INVENTION

It is an object of the present invention to at least partially solve the problems in the conventional technology.

An optical scanner according to one aspect of the present invention includes at least one semiconductor laser as an optical source; a deflector that deflects an optical beam from the semiconductor laser; a first optical system that guides the optical beam from the semiconductor laser to the deflector; a second optical system that condenses on a scanned surface, the optical beam deflected by the deflector to form an optical spot; and an optical receiver that detects, before the optical beam scans the scanned surface, the optical beam. In the optical scanner, the first optical system includes at least one resin-made diffractive lens that has a power in a main scanning direction and a vertical scanning direction, and an optical axis of at least one surface of the resin-made diffractive lens is shifted, with respect to the optical beam, in at least a main scanning cross section.

An optical scanner according to another aspect of the present invention includes at least one semiconductor laser as an optical source; a deflector that deflects an optical beam from the semiconductor laser; a first optical system that guides the optical beam from the semiconductor laser to the deflector; a second optical system that condenses on a scanned surface, the optical beam deflected by the deflector to form an optical spot; and an optical receiver that detects, before the optical beam scans the scanned surface, the optical beam. In the optical scanner, the first optical system includes at least one resin-made diffractive lens that has a power in at least a vertical scanning direction, and an incident surface and an exit surface of the resin-made diffractive lens tilt in a main scanning cross section.

An optical scanner according to still another aspect of the present invention includes at least one semiconductor laser as an optical source; a deflector that deflects an optical beam from the semiconductor laser; a first optical system that guides the optical beam from the semiconductor laser to the deflector; a second optical system that condenses on a scanned surface, the optical beam deflected by the deflector to form an optical spot; and an optical receiver that detects, before the optical beam scans the scanned surface, the optical beam. In the optical scanner, the first optical system includes at least one resin-made diffractive lens that has a power in at least a vertical scanning direction, and at least one surface of the resin-made diffractive lens tilts, with respect to a surface perpendicular to the optical beam, in a main scanning cross section.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
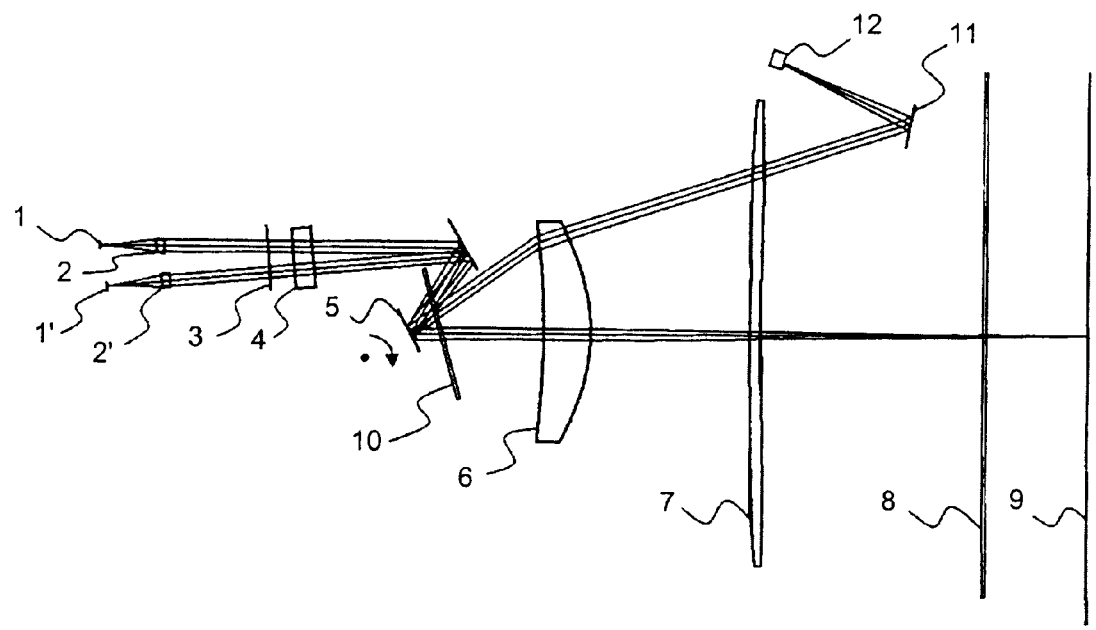
FIG. 1 is a schematic of a basic structure of an image forming apparatus according to the present invention.

FIG. 1 is a schematic of a basic structure of an image forming apparatus according to the present invention.

In FIG. 1, optical sources (semiconductor lasers) are denoted by 1 and 1', coupling lenses (first lenses) are denoted by 2 and 2', a first aperture is denoted by 3, an anamorphic lens (second lens) is denoted by 4, a polygon mirror as a deflector is denoted by 5, a deflector-side scanning lens is denoted by 6, an image-surface-side scanning lens is denoted by 7, a dust-proof glass is denoted by 8, an image surface is denoted by 9, a soundproof glass is denoted by 10, a synchronization mirror is denoted by 11, and a synchronization detector (photo detector) is denoted by 12.

The optical source 1 is a semiconductor laser having a cover glass of 0.3 mm in thickness.

A light beam emitted from the optical source 1 becomes a parallel light, a weak divergent light, or a weak convergent light via the coupling lens 2 having a resin-made diffracting surface. Subsequently, the light beam passes through the aperture 3 and becomes the parallel light in the main scanning direction and the light beam that focuses in a vicinity of the polygon mirror 5 in a vertical scanning direction via the anamorphic lens 4 having the resin-made diffracting surface. Furthermore, the light beam is deflected by the polygon mirror 5, passes through the deflector-side scanning lens 6 and the image-surface-side scanning lens 7, and an image is formed on the image surface 9 via the dust-proof glass 8. The soundproof glass 10 is provided between the polygon mirror 5 and the deflector-side scanning lens 6.

The optical system between the optical source 1 and the polygon mirror 5 is called a first optical system and the optical system between the polygon mirror 5 and the image surface 9 is called a second optical system.

The optical source 1 and the coupling lens 2 are fixed to a same member of aluminum material.

The polygon mirror 5 rotates at an equiangular speed in an arrow direction. Before exposing an effective area on the scanned surface to the light beam, the beam reflected on the synchronization mirror 11 is guided to the synchronization detector 12, synchronization detecting signals are then obtained for each polygon mirror surface, and the exposure of the beam on the scanned surface is started after a certain period of time. In such a structure, even if an angle of an incident beam into the polygon mirror 5 is changed in a main scanning cross section in the optical system before the deflector, a displacement of a beam spot in the main scanning direction can be reduced.

Figure 2:
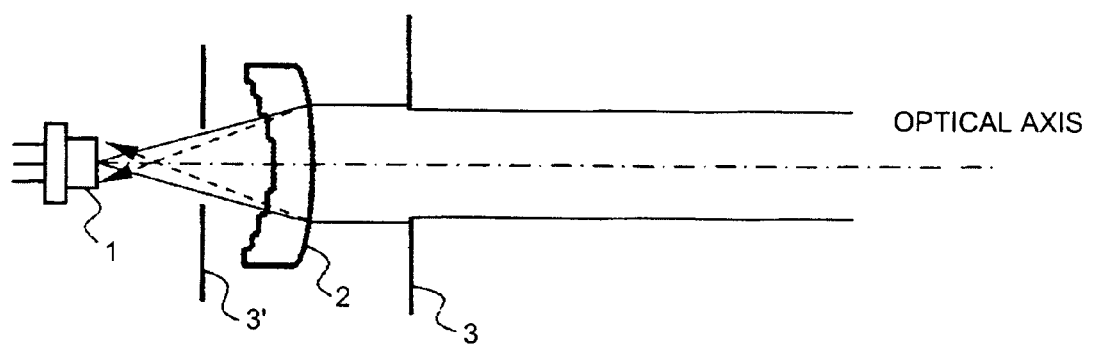
FIG. 2 is a schematic for explaining problems of a light reflected on a coupling lens.

FIG. 2 is a schematic for explaining problems of the light reflected on the coupling lens 2.

Figure 3:
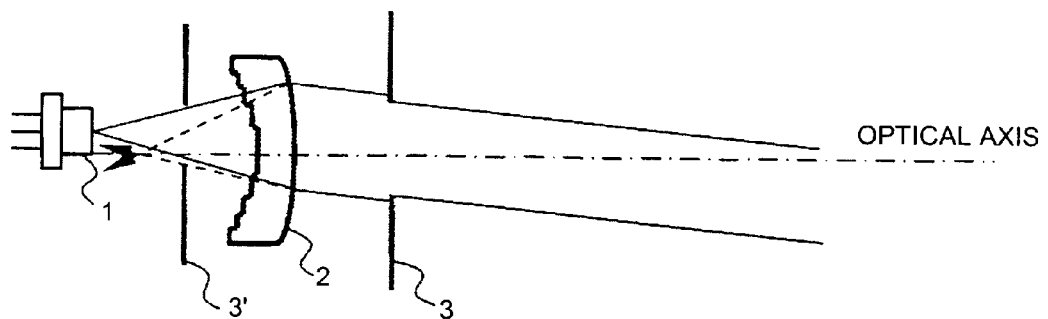
FIG. 3 is a schematic for explaining a structure of the present invention.

FIG. 3 is a schematic for explaining the structure of the present invention.

In FIGS. 2 and 3, a second aperture is denoted by 3'.

Each of FIGS. 2 and 3 shows main scanning direction cross section, correspondingly to FIG. 1. Therefore, a surface parallel to the paper is the main scanning direction.

The coupling lens 2 (referred to as "diffractive lens 2") that couples the divergent light beam emitted from the semiconductor laser 1 is "a resin-made lens whose one surface has a concentric diffracting surface of a step shape and another surface has a rotationally-symmetric aspherical surface". An incident surface is a surface that does not have the power both in the main scanning direction and the vertical scanning direction. An exit surface is a coaxial aspherical surface. It should be noted that the step shape shown in FIG. 2 is magnified.

As shown in FIG. 2, when an optical axis (a symmetrical axis in the main scanning cross section and a vertical scanning cross section is defined as the optical axis and the same definition applies hereinafter) of the coupling lens 2 is positioned such that the optical axis is at the center of the beam, the reflected scattered light on the diffracting surface again returns to the semiconductor laser 1. Due to this, various problems that cause the density irregularities on the image arise. As shown in FIG. 2, the first aperture 3 is positioned for regulating the beam diameter on the scanned surface and the second aperture 3' is positioned for cutting an unwanted light. The second aperture 3' allows reducing the returning light to a laser diode (LD), however, it is not sufficient.

As shown in FIG. 3, the optical axis of at least one surface of the resin-made diffractive lens 2 is shifted in the main scanning direction with respect to the incident beam. Though the optical axis of the surface can be shifted in the vertical scanning direction instead of shifting in the main scanning direction, a beam position in the vertical scanning direction changes on the scanned surface due to the change in a wavelength of the semiconductor laser 1 that arises due to the temperature variation when the diffractive lens 2 is shifted in the vertical scanning direction. Even when the optical axis is shifted in the main scanning direction, the beam position naturally changes due to the change in the wavelength of the semiconductor laser 1 on the scanned surface that arises due to the temperature variation. However, since a writing reference position is set whenever a light receiving unit, which receives an optical beam before scanning with the beam, receives the optical beam, a fluctuation is canceled and the change in the beam position for actually forming the image can be neglected. In other words, the returning light to the semiconductor laser 1 can be reduced and the displacement of the beam on the scanned surface can also be reduced by shifting the optical axis with respect to the main scanning direction for which the synchronous detection is carried out.

Figure 4:
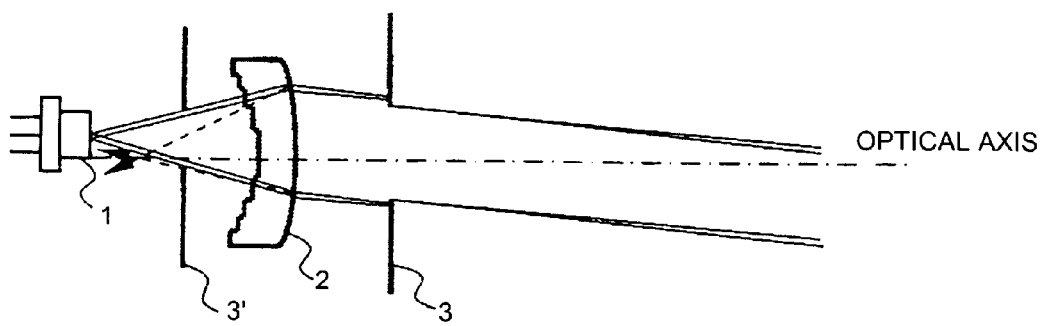
FIG. 4 is a schematic for explaining a structure when a multi-beam optical source is employed.

FIG. 4 is a schematic for explaining the structure when a multi-beam optical source is employed.

A multi-beam is available as an effective method for realizing a high-density and a high-speed. Though another method of causing a high-speed rotation of the polygon mirror 5 is available, there arise problems such as increases in an unwanted noise, oscillations, and power consumption. In contrast, the multi-beam does not bring about such problems in scanning.

FIG. 4 shows a combined structure of a monolithic array of the semiconductor laser 1 and the diffractive lens 2.

Similar to the case of using one beam as mentioned earlier, when the optical axis of the coupling lens 2 is positioned such that the optical axis is at the center of one of the multiple beams, the reflected scattered light on the diffracting surface again returns to the semiconductor laser 1, and various problems which cause the density irregularities on the image arise. As shown in FIG. 4, the optical axis of at least one surface of the resin-made diffractive lens 2 is shifted in the main scanning direction with respect to the multiple incident beams. Since the optical axis is shifted with respect to the main scanning direction for which the synchronous detection is carried out, the returning light to the semiconductor laser 1 can be reduced and the displacement of the beam on the scanned surface can also be reduced.

The problems when shifting the optical axis of the surface in the vertical scanned direction are already explained.

Figure 5:
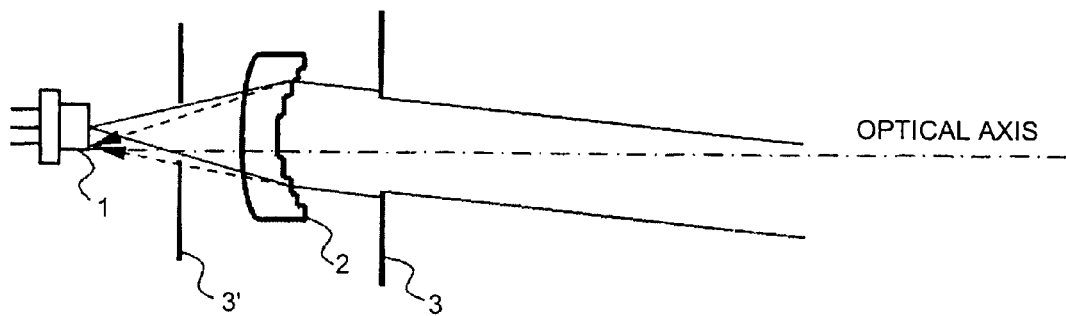
FIG. 5 is a schematic for explaining problems of a reflected scattered light.

FIG. 5 is a schematic for explaining the problems of the reflected scattered light.

The structure of FIG. 5 has three salient features explained below.
Feature 1: The incident surface has the refracting surface and the exit surface has the diffracting surface.
Feature 2: An absolute value of the power of the incident surface is greater than the absolute value of the power of the exit surface.
Feature 3: The exit surface is set such that a diffracting power and a refracting power are offset to each other.

Upon satisfying the above conditions, the beam reflected on the exit surface is refracted on the incident surface and is condensed on the position that is in the vicinity of a luminous point in the optical axis direction. The optical beam that is again reflected on a semiconductor laser chip or the stem passes through the coupling lens 2, the anamorphic lens 4, the polygon mirror 5, the deflector-side scanning lens 6, and the image-surface-side scanning lens 7, and becomes a ghost light that is condensed on the scanned surface. Among various ghost lights which is reflected on a lens surface and reaches the scanned surface, the image is mostly affected by the beams that are condensed on the scanned surface.

Figure 6:
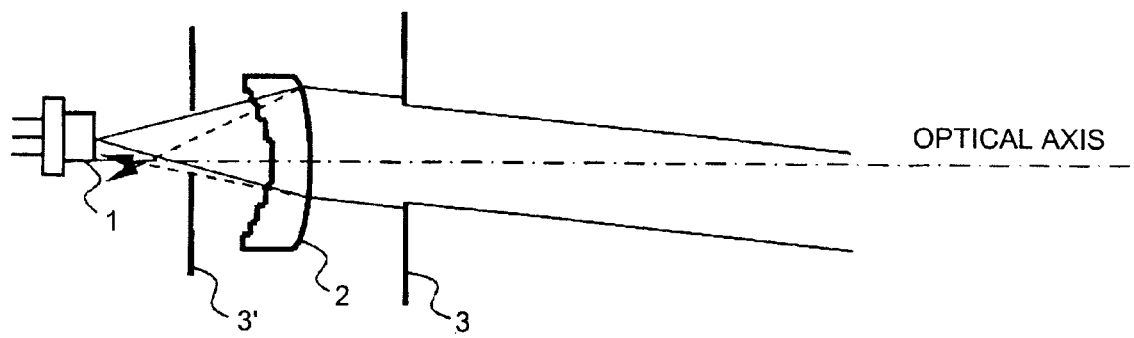
FIG. 6 is a schematic of the structure of the present invention in which the problems of the reflected scattered light are resolved.

FIG. 6 is a schematic of the structure of the present invention which resolves the problems of the reflected scattered light.

The structure of FIG. 6 has two salient features explained below.
Feature 1: The incident surface has the diffracting surface and the exit surface has the refracting surface.
Feature 2: The absolute value of the power of the incident surface is smaller than the absolute value of the power of the exit surface.

The beam reflected on the exit surface is condensed on a position away from the luminous point in the optical axis direction. Therefore, though the optical beam that is again reflected on the semiconductor laser chip or the stem passes through the coupling lens 2, the anamorphic lens 4, the polygon mirror 5, the deflector-side scanning lens 6, and the image-surface-side scanning lens 7, and the ghost light is generated towards the scanned surface, the ghost light is not condensed on the scanned surface. Thus, the image is not significantly affected. The resin-made diffractive lens is usually manufactured by a molding process. In the manufacturing, it is easy to demold the lens when the diffracting surface on which a lot of minute grooves are formed is designed to have a small area. Therefore, it is advantageous in workability when the diffracting surface is located on the incident surface of the lens.

The incident surface has the concentric diffracting surface and the exit surface has the coaxial aspherical surface, and the incident surface and the exit surface are designed such that a wave aberration of the outgoing light can be favorably corrected.

The diffracting surface of the incident surface is formed in combination with the diffracting power and a curvature radius (refracting power) of a substrate shape. It is desirable that the exit surface has the positive power both in the main scanning direction and the vertical scanning direction, and also desirable to reduce as much effect as possible with respect to a relative surface eccentricity (an error caused in the processing) of the incident surface and exit surface. To satisfy such requirements, the incident surface is desired to have a design that the diffracting power and the refracting power are offset to each other. Ultimately, it is desirable that the absolute value of the diffracting power and the refracting power is same, and further that signs, between the positive sign and the negative sign, of the diffracting power and the refracting power are opposite to each other. The diffracting surface is in a concentric step-shape and a synthesized power of the surface becomes zero. Such diffracting surface having the step-shape is beneficial from the processing and instrumentation point of view. For reducing the change in a beam waist position that arises due to the temperature variation, the diffracting power is desirably set to be positive.

By setting the incident surface of the diffractive lens such that the diffracting power and the refracting power are offset to each other, even when the relative surface eccentricity (the error caused in the processing) exists in the incident surface and the exit surface, the beam spot diameter can be reduced and an optical scanner with high-resolution can be provided.

Figure 7:
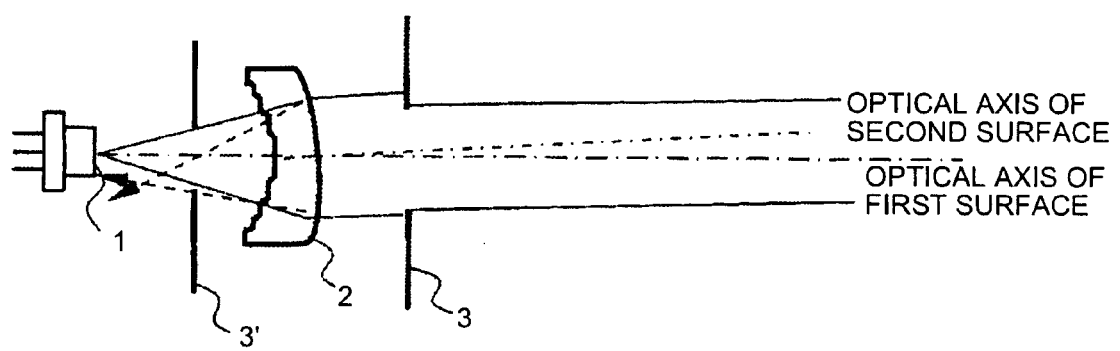
FIG. 7 is a schematic in which an optical axis of an incident surface and an exit surface tilts.

FIG. 7 is a schematic in which the optical axis of the incident surface and the exit surface tilts.

In the structure, in addition to the effects explained with reference to FIG. 3, the ghost light generated only in the coupling lens 2 can be removed. For example, the ghost light generated when the beam reflected on the exit surface is again reflected on the incident surface is tilted in the main scanning direction, and thereby can be reduced.

Returning to FIG. 1, an application example of the anamorphic lens 4 (hereinafter, "resin-made diffractive lens 4") having a resin-made diffracting surface according to the present invention will be explained.

The first optical system includes the resin-made diffractive lens 4 that has the power at least in the vertical scanning direction. As shown in FIG. 1, at least one surface (both the incident surface and the exit surface in FIG. 1) of the resin-made diffractive lens 4 is tilted in the main scanning cross section with respect to the surface perpendicular to the incident beam. The surface of the resin-made diffractive lens 4 having the power in the vertical scanning direction is tilted with respect to the main scanning surface in which the synchronous detection is carried out, the returning light to the semiconductor laser 1 and 1' can thus be reduced, and the displacement of the beam on the scanned surface can also be reduced.

Even when at least one surface of the resin-made diffractive lens 4 is tilted in the vertical scanning cross section with respect to the surface perpendicular to the incident beam, the returning light to the semiconductor laser 1 and 1' can be reduced. However, similarly to the case of shifting the optical axis, the change in the wavelength of the semiconductor laser 1 caused by the temperature variation causes a change in the beam position in the vertical scanning direction on the scanned surface.

In FIG. 1, the scanned surface is scanned by the multiple beams, and at least one surface (both the incident surface and the exit surface) of the resin-made diffractive lens 4 is tilted in the main scanning cross section with respect to a plurality of surfaces respectively perpendicular to a plurality of incident beams.

Thus, the returning light of each of the plurality of beams to the semiconductor laser 1 can be reduced and the displacement of the beam on the scanned surface can be reduced.

As shown in FIG. 1, the surface perpendicular to two incident beams is tilted inversely in the main scanning cross section with respect to the surface of the resin-made diffractive lens 4. Due to this, the returning light can be reduced and a deterioration of wave aberration due to the tilt of the surface perpendicular to the incident beam and a temperature correction effect of the diffractive lens can be suppressed to the minimum limit. Further, a loss in a light quantity with respect to the multiple beams can also be suppressed to the minimum limit.

Figure 8:
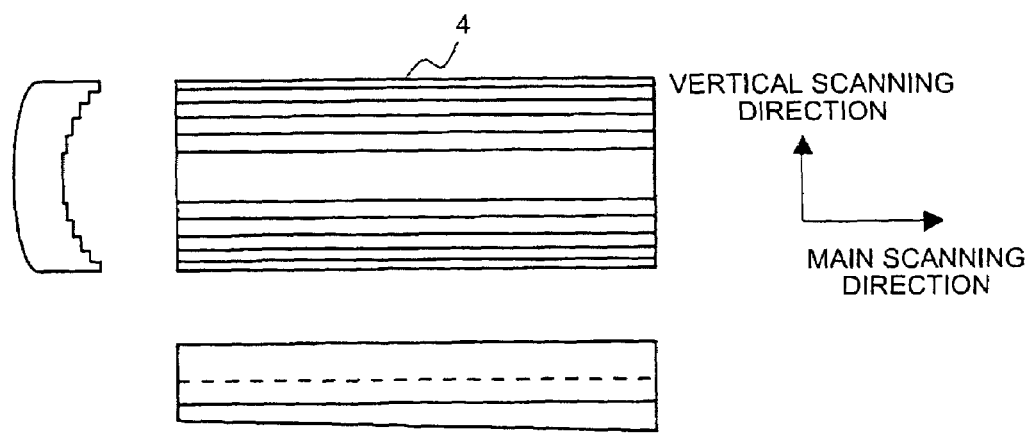
FIG. 8 is a schematic for explaining a structure of a resin-made diffractive lens.

FIG. 8 is a schematic for explaining the structure of the resin-made diffractive lens 4.

In a multi-beam method, when the multi beams pass through the resin-made diffractive lens 4 (a linear image forming lens), generally, centers of light rays are separated from each other in the main scanning direction. Even if the centers of the light rays of the multiple beams overlap with each other in a design median value, the light rays are separated in the main scanning direction due to a mechanical placement error.

In FIG. 8, a lateral direction is the main scanning direction and the resin-made diffractive lens 4 is viewed from the optical axis direction. By arranging a long straight diffracting surface in the main scanning direction, even if the center of the light ray separates from the main scanning direction, the power in the vertical scanning direction can be even out and the changes in the vertical scanning beam spot position that arise due to the temperature variation can be even out, thereby enabling to reduce a vertical scanning beam pitch fluctuations on the scanned surface.

Figure 9:
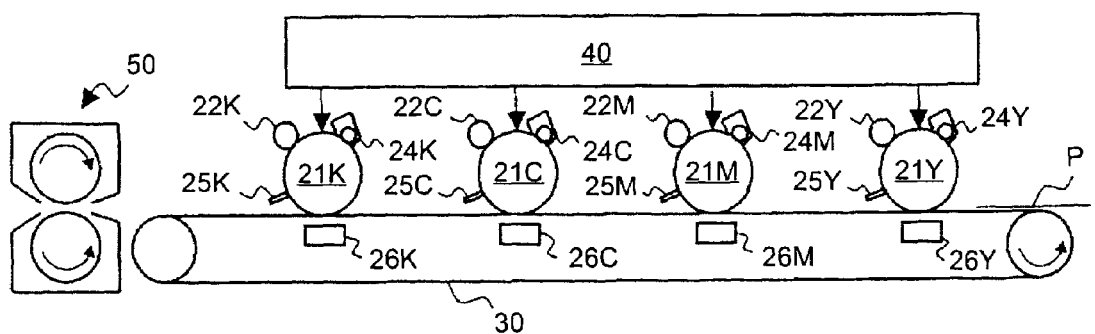
FIG. 9 is a schematic of a basic structure of a multi-color image forming apparatus.

FIG. 9 is a schematic of a basic structure of a multi-color image forming apparatus.

In FIG. 9, a photoreceptor is denoted by 21, a charging unit is denoted by 22, a developing unit is denoted by 24, a cleaning unit is denoted by 25, a charging unit for transfer is denoted by 26, a transfer belt is denoted by 30, a writer is denoted by 40, and a fixing unit is denoted by 50.

Furthermore, additional characters Y, M, C, and K indicate Yellow, Magenta, Cyan, and Black, respectively. In an explanation common for all colors, the additional character indicating the color is omitted.

The photoreceptor 21 rotates in an arrow direction and the charging unit 22, the developing unit 24, the charging unit for transfer 26, and the cleaning unit 25 are positioned in a rotating sequence.

The charging unit 22 is a charging member that forms a charging device for uniformly charging a surface of the photoreceptor 21. The writer (optical scanner) 40 irradiates, with the beam, the surface of the photoreceptor 21 positioned between the charging unit 22 and the developing unit 24, and an electrostatic latent image is formed on the photoreceptor 21. Based on the electrostatic latent image, the developing unit 24 forms a toner image on the surface of the photoreceptor 21. Furthermore, the charging unit for transfer 26 transfers to a recording paper P, the toner image transferred in each color sequence, and finally the fixing unit 50 fixes the image on the recording paper P.

The optical scanner can prepare an optical layout shown in FIG. 1 independently for each color. Similar to the commonly used technologies, an optical deflector (rotating polygon mirror) is commonly used, and the deflector-side scanning lens 6 of the scanning optical system in each optical scanner can be commonly used in the optical scanning of photoreceptors 21M and 21Y and also in the optical scanning of photoreceptors 21K and 21C. In any optical scanner, due to the shift in the main scanning direction and the tilt in the main scanning cross section according to the present invention, the returning light to the LD can be reduced and thus the displacement of the beam position in the vertical scanning direction which does not have a correcting unit can be reduced. Especially, in the multi-color image forming apparatus, a request for reducing the color drift is increasing and an effectiveness of the technology of the present invention is quite notable.

Therefore, the present invention, when applied, enables to provide a high-resolution image forming apparatus which can reduce the color drift and the returning light to the LD.

Furthermore, the present invention, needless to say, can be applied to an image forming apparatus that includes only one photoreceptor.

According to an embodiment of the present invention, an optical axis of at least one resin-made diffractive lens that has a power in a main scanning direction and a vertical scanning direction is shifted, thereby enabling to reduce a returning light to a semiconductor laser and a displacement of a beam position on a scanned surface.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical scanner comprising:
at least one semiconductor laser as an optical source;
a deflector that deflects an optical beam from the semiconductor laser;

a first optical system that guides the optical beam from the semiconductor laser to the deflector;

a second optical system that condenses on a scanned surface, the optical beam deflected by the deflector to form an optical spot; and an optical receiver that detects, before the optical beam scans the scanned surface, the optical beam, wherein the first optical system includes at least one resin-made diffractive lens that has a power in a main scanning direction and a vertical scanning direction, and an optical axis of at least one surface of the resin-made diffractive lens is shifted, with respect to the optical beam, in at least a main scanning cross section.

2. The optical scanner according to claim 1, wherein the first optical system guides to the deflector, a plurality of optical beams from a plurality of semiconductor lasers, and the optical axis of at least one surface of the resin-made diffractive lens is shifted, with respect to the plurality of optical beams, in at least the main scanning cross section.

3. The optical scanner according to claim 1, wherein the resin-made diffractive lens is a coupling lens that couples the optical beam from the semiconductor laser and satisfies conditions that an incident surface is a diffracting surface and an exit surface is a refracting surface, and an absolute value of the power of the incident surface is smaller than an absolute value of the power of the exit surface.

4. The optical scanner according to claim 3, wherein the incident surface is set such that a diffracting power and a refracting power are offset.

5. The optical scanner according to claim 1, wherein a plurality of sets each including the optical source, the first optical system, and the second optical system are provided and guide optical beams to different scanned surfaces, respectively.

6. An image forming apparatus comprising:

the optical scanner according to claim 1;

a photosensitive image bearing body as a scanned surface;

a charging unit that uniformly charges a surface of the image bearing body; and a developing unit that visualizes a latent image formed by the optical scanner.

7. The image forming apparatus according to claim 6, wherein a plurality of image bearing bodies are provided.

8. An optical scanner comprising:

at least one semiconductor laser as an optical source;

a deflector that deflects an optical beam from the semiconductor laser;

a first optical system that guides the optical beam from the semiconductor laser to the deflector;

a second optical system that condenses on a scanned surface, the optical beam deflected by the deflector to form an optical spot; and an optical receiver that detects, before the optical beam scans the scanned surface, the optical beam, wherein the first optical system includes at least one resin-made diffractive lens that has a power in at least a vertical scanning direction, and an incident surface and an exit surface of the resin-made diffractive lens tilt in a main scanning cross section.

9. The optical scanner according to claim 8, wherein a plurality of sets each including the optical source, the first optical system, and the second optical system are provided and guide optical beams to different scanned surfaces, respectively.

10. An image forming apparatus comprising:

the optical scanner according to claim 8;

a photosensitive image bearing body as a scanned surface;

a charging unit that uniformly charges a surface of the image bearing body; and a developing unit that visualizes a latent image formed by the optical scanner.

11. The image forming apparatus according to claim 10, wherein a plurality of image bearing bodies are provided.

12. An optical scanner comprising:

at least one semiconductor laser as an optical source;

a deflector that deflects an optical beam from the semiconductor laser;

a first optical system that guides the optical beam from the semiconductor laser to the deflector;

a second optical system that condenses on a scanned surface, the optical beam deflected by the deflector to form an optical spot; and an optical receiver that detects, before the optical beam scans the scanned surface, the optical beam, wherein the first optical system includes at least one resin-made diffractive lens that has a power in at least a vertical scanning direction, and at least one surface of the resin-made diffractive lens tilts, with respect to a surface perpendicular to the optical beam, in a main scanning cross section.

13. The optical scanner according to claim 12, wherein the first optical system guides to the deflector, a plurality of optical beams from a plurality of semiconductor lasers, and an optical axis of at least one surface of the resin-made diffractive lens tilts, with respect to a plurality of surfaces respectively perpendicular to the plurality of optical beams, in the main scanning cross section.

14. The optical scanner according to claim 13, wherein at least one set of the plurality of surfaces tilts, with respect to at least one surface of the resin-made diffractive lens, inversely to each other in the main scanning cross section.

15. The optical scanner according to claim 12, wherein the resin-made diffractive lens is a linear image forming lens that converts the optical beam incident from the semiconductor laser to a long linear image in a main scanning direction, and a diffracting surface of the linear image forming lens is formed in a groove geometry parallel to the main scanning direction.

16. The optical scanner according to claim 12, wherein a plurality of sets each including the optical source, the first optical system, and the second optical system are provided and guide optical beams to different scanned surfaces, respectively.

17. An image forming apparatus comprising:

the optical scanner according to claim 12;

a photosensitive image bearing body as a scanned surface;

a charging unit that uniformly charges a surface of the image bearing body; and a developing unit that visualizes a latent image formed by the optical scanner.

18. The image forming apparatus according to claim 17, wherein a plurality of image bearing bodies are provided.

* * * * *